US010391512B1

(12) United States Patent
Samuel

(10) Patent No.: US 10,391,512 B1
(45) Date of Patent: Aug. 27, 2019

(54) MULTIFUNCTIONAL IRRIGATION PLIERS AND METHOD OF PIERCING, CUTTING AND FITTING AN IRRIGATION TUBE

(71) Applicant: Brian Keith Samuel, Central Point, OR (US)

(72) Inventor: Brian Keith Samuel, Central Point, OR (US)

( * ) Notice: Subject to any disclaimer, the term of this patent is extended or adjusted under 35 U.S.C. 154(b) by 417 days.

(21) Appl. No.: 15/265,309

(22) Filed: Sep. 14, 2016

Related U.S. Application Data

(60) Provisional application No. 62/386,003, filed on Nov. 16, 2015.

(51) Int. Cl.
*B05B 15/658* (2018.01)
*A01G 25/02* (2006.01)
*B05B 1/20* (2006.01)

(52) U.S. Cl.
CPC .......... *B05B 15/658* (2018.02); *A01G 25/023* (2013.01); *B05B 1/202* (2013.01)

(58) Field of Classification Search
CPC .. B25B 7/02; B25B 7/22; B23D 21/10; B26B 17/00; B26D 3/16
See application file for complete search history.

(56) References Cited

U.S. PATENT DOCUMENTS

| | | | | |
|---|---|---|---|---|
| 4,796,318 | A | 1/1989 | Bigej | |
| 5,201,532 | A | 4/1993 | Salesky et al. | |
| 5,893,201 | A | 4/1999 | Myers | |
| 6,430,767 | B1 | 8/2002 | Ramos et al. | |
| 6,901,543 | B2 | 5/2005 | Dorsey | |
| 7,185,409 | B1 * | 3/2007 | Myers | A01G 25/023 269/6 |
| 8,850,933 | B2 | 10/2014 | Amouroux | |
| 2011/0167612 | A1 | 7/2011 | Marshall | |
| 2011/0185577 | A1 * | 8/2011 | Ronan | B23D 21/10 30/92 |

FOREIGN PATENT DOCUMENTS

| | | |
|---|---|---|
| CN | 202825602 | 3/2013 |

* cited by examiner

*Primary Examiner* — David B. Thomas
(74) *Attorney, Agent, or Firm* — Jerry Haynes Law

(57) ABSTRACT

A multifunctional irrigation pliers and method of piercing, cutting, and fitting an irrigation tube with an irrigation pliers. The irrigation pliers enables the forming of a hole in an irrigation tube, the placement of a nozzle or a drip emitter into the formed hole or a terminal opening of the irrigation tube, the cutting of a length of the irrigation tube, and general deforming of sections of the irrigation tube. A first jaw and a second jaw are pivotally attached together at a pivoting joint to allow the jaws to be pivotally displaced toward and away from each other by moving a first handle and a second handle to and away from each other. The inner surfaces of the jaw comprise a blade, a spike, and retaining slots sequentially positioned across the jaws to engage the irrigation tube, the nozzle, and the drip emitter.

20 Claims, 10 Drawing Sheets

MULTIFUNCTIONAL IRRIGATION PLIERS AND METHOD OF PIERCING, CUTTING AND FITTING AN IRRIGATION TUBE

CROSS-REFERENCE OF RELATED APPLICATIONS

This application claims the benefits of U.S. provisional application No. 62/386,003, filed Nov. 16, 2015 and entitled DRIP IRRIGATION PLYERS, which provisional application is incorporated by reference herein in its entirety.

FIELD OF THE INVENTION

The present invention relates generally to a multifunctional irrigation pliers and method of piercing, cutting, and fitting an irrigation tube with an irrigation pliers. More so, the present invention relates to a multifunctional irrigation pliers that enables the forming of a hole in an irrigation tube, the placement of a nozzle or a drip emitter into the formed hole or a terminal opening of the irrigation tube, the cutting of a length of the irrigation tube, and general deforming of sections of the irrigation tube through use of a blade, a spike, and retaining slots sequentially positioned across the jaws of the pliers to engage the irrigation tube, the nozzle, and the drip emitter.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known that drip irrigation is a low-pressure, low-volume watering system that delivers water to home landscapes in a variety of methods, including dripping, spraying and streams. By keeping the roots moist but not soaked, you use less water than other irrigation techniques.

Typically, drip irrigation systems, such as those used in agriculture, are well known and in widespread use. Most such drip irrigation systems provide lengths of irrigation hose or pipe, into which a series of nozzle or emitter devices are installed in a spaced pattern to deliver the desired irrigation water at the appropriate points along the length of the pipe. Installation of these emitter devices into the irrigation pipe can, however, be an awkward and time-consuming task.

Typically, the installation worker uses a tool such as a hole punch to first cut a hole in the irrigation pipe at a desired location, and then the worker must manually attempt to press the barbed spike of the emitter device into the hole. This process is then repeated at each emitter location along the length of the pipe, which may constitute thousands of emitters. This labor-intensive activity is extremely inefficient.

Other proposals have involved tools for preparing irrigation tubes and drip emitters for operation in drip irrigation. The problem with these is that they only perform a few functions to the pipe and drip emitters. Also, the tool or pliers is not operable with one hand. Even though the above cited irrigation tools meet some of the needs of the market, a multifunctional irrigation pliers that provides numerous functions that are necessary for preparing an irrigation tube by piercing, fitting, and manipulating an irrigation tube is still desired.

SUMMARY

Illustrative embodiments of the disclosure are generally directed to a multifunctional irrigation pliers and method of piercing, cutting, and fitting an irrigation tube with an irrigation pliers. The multifunctional irrigation pliers provides numerous functions that are necessary for preparing an irrigation tube, and especially a drip irrigation tube, pipe, and conveyor known in the art for drip irrigation operation. The irrigation pliers is effective for piercing, fitting, and manipulating an irrigation tube. The irrigation pliers is operable with one hand.

In some embodiments, the irrigation pliers is configured to perform the following functions: form a hole in an irrigation tube; place a nozzle or a drip emitter into the formed hole, or a terminal opening of the irrigation tube; cut a length of the irrigation tube; firmly retain one end of the irrigation tube in place while pressing a drip emitter in a formed hole or terminal opening; and generally deform a section of the irrigation tube.

In one embodiment, the irrigation pliers includes a pair of elongate jaws that are pivotally attached together at a pivoting joint to allow the jaws to be pivotally displaced toward and away from each other by moving a first handle and a second handle to and away from each other. The jaws and handles are disposed in the same plane. In this manner, the jaws may be pivotally displaced between an open position and a closed position by squeezing and releasing the first handle and the second handle.

The jaws have outer surfaces and complementary gripping surfaces. The jaws utilize a combination of gripping surface area, ridges, concavities, slots, and lips to enable fixed holding, fitting, cutting, and forming holes in the irrigation tube.

In some embodiments, the first jaw includes a proximal concavity that is sized and dimensioned to retain a blade. The second opposed jaw includes a saddle configured to engage a piece of the irrigation tube, such that closure of the jaws to the closed position causes the blade to cut a length of the irrigation tube across the saddle. The irrigation tube may traverse the saddle to selectively cut a desired length of the irrigation tube.

In some embodiments, the first jaw includes a first middle concavity having an inwardly-directed spike, while the second jaw includes a second middle concavity that is configured to engage a piece of irrigation tube. Closure of the jaws to the closed position causes the spike to pierce a hole in the irrigation tube. The irrigation tube may traverse the second middle concavity to selectively puncture a desired section of the irrigation tube.

The jaws further comprise terminal regions that enable secure retention, manipulation, and fitting of the irrigation tube. A first jaw is defined by a first terminal region. The first terminal region includes a first distal concavity defined by a first slot having a textured surface. The first slot is configured to securely retain the irrigation tube, the nozzle, or the drip emitter.

Similarly, the second jaw is defined by a second terminal region. The second terminal region includes a second distal concavity defined by a second slot having a textured surface. The second slot securely retains the irrigation tube, the nozzle, and the drip emitter in general alignment with the first slot for fitting and manipulating the irrigation tube.

When the irrigation tube is retained in the first or second slots, forcible insertion of the nozzle or drip emitter into a terminal opening of the irrigation tube or the hole previously formed in the irrigation tube is possible. Further, the irrigation tube may be sufficiently held in the slots to enable bending in lateral and coplanar directions relative to the multifunctional pliers.

One advantage of the present invention is to provide a pair of pliers that is effective for piercing, fitting, and manipulating an irrigation tube.

Another objective is to provide the piercing of a pipe, as well as the fitting of a drip emitter on this pipe, by means of a single hand-operated tool.

Another objective is to provide a pair of elongate handles for the pliers that can be manipulated either left or right handed.

Another objective is to provide a second jaw having a second terminal region that fixedly retains a fitting while a first terminal region of a first jaw drives an irrigation tube into the fitting.

Another objective is to provide a spike that forms holes along the length of the irrigation tube.

Another objective is to provide a blade that cuts sections of the irrigation tube.

Another objective is to ensure that the drip emitters are positioned regularly along the irrigation pipe.

Yet another objective is to implant an irrigation pipe amongst the region to be irrigated, and, only then, to fit each drip emitter individually in the exact location on the irrigation tube where it is necessary to ensure that water is distributed.

Another objective is to provide an inexpensive to manufacture irrigation pliers.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

and

Figure 11:
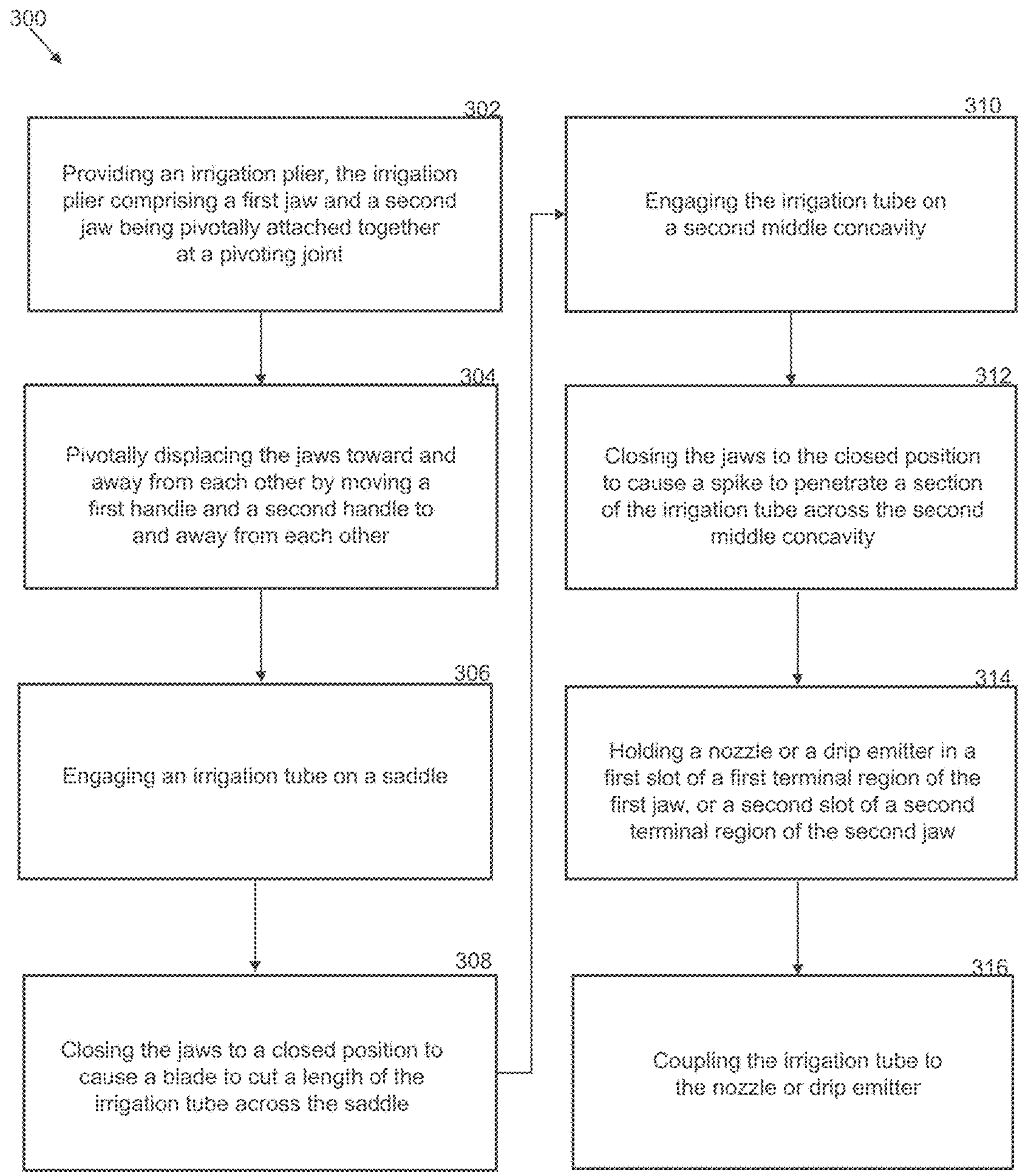

FIG. 11 illustrates a flowchart of an exemplary method of piercing, cutting, and fitting an irrigation tube with an irrigation pliers, in accordance with an embodiment of the present invention.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A multifunctional irrigation pliers 100 and method 300 of piercing, cutting, and fitting an irrigation tube with an irrigation pliers is referenced in FIGS. 1-11. The multifunctional irrigation pliers 100, hereafter "pliers 100", performs numerous functions that are necessary for preparing an irrigation tube 200, and especially a drip irrigation tube, pipe, or conveyor for drip irrigation operations. In one embodiment, the pliers 100 performs about eight functions related to drip irrigation assembly and installation.

One exemplary use of the irrigation pliers 100 is to facilitate and expedite implanting an irrigation pipe 200 amongst the plantations to be irrigated, and, then, to join different irrigation tubes, and to fit drip emitters and nozzles individually in the exact location on the irrigation tube where it is necessary to ensure that water is distributed. The use of a single tool to perform this function is advantageous.

As discussed above, the irrigation pliers 100 is multifunctional, using a series of complementary components along the gripping surfaces 106,144 of the jaws 102,128 to perform different, but complementary functions. In one embodiment, the components of the irrigation pliers 100 are configured to enable formation of a hole in an irrigation tube 200; placement of a nozzle, a drip emitter 202, or fitting into the formed hole, or a terminal opening of the irrigation tube 200; cutting a desired length of irrigation tube 200; firmly retaining one end of the irrigation tube 200; and generally deformation of a section of the irrigation tube 200.

Figure 1:
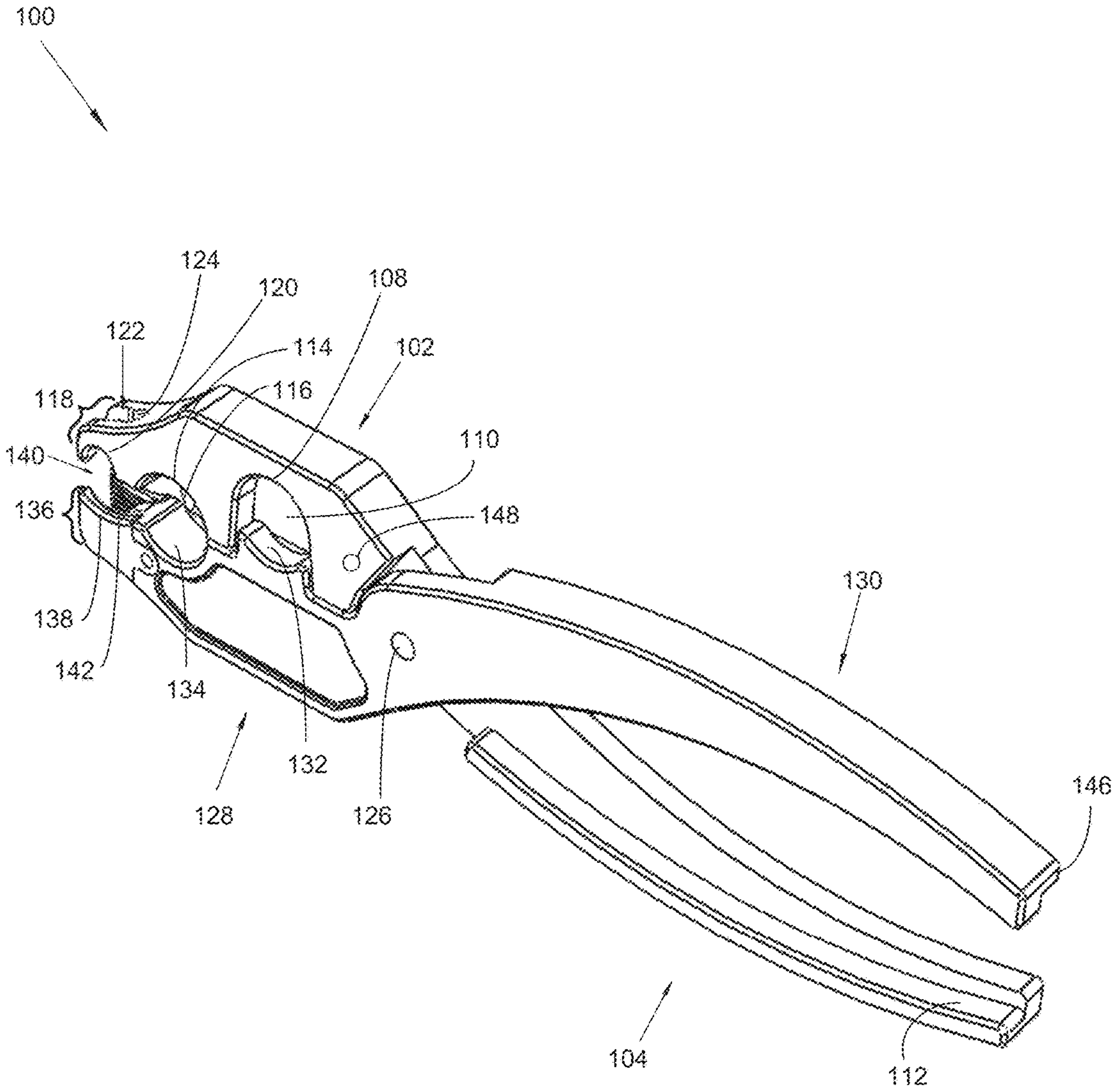
FIG. 1 illustrates a perspective view of an exemplary irrigation pliers, in accordance with an embodiment of the present invention.

As referenced in FIG. 1, the irrigation pliers 100 comprises opposed complementary jaws 102, 128 having gripping surfaces 106, 144, a blade 110, a spike 116, and a pair of slots 122,140 that can be manipulated by a pair of elongate handles 104,130 to pierce, fit, and deform an irrigation tube 200 in preparation for mating with various nozzles, drip emitters, fittings, and secondary tubes. The pliers 100, thus provides an all-in-one tool for preparing the irrigation tube 200 for drip irrigation in a plantation. Further, the pliers 100 is operable with one hand and without requiring additional tools. Suitable materials for the pliers 100 may include, without limitation, aluminum, stainless steel, metal, rigid polymers, and combinations thereof.

Figure 2:
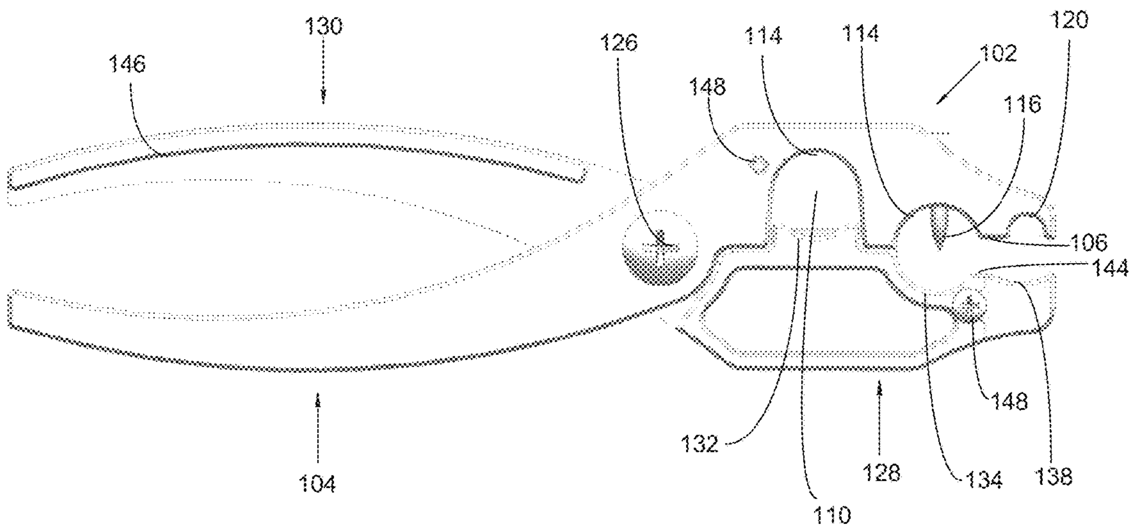
FIG. 2 illustrates an elevated side view of the irrigation pliers shown in FIG. 1, in accordance with an embodiment of the present invention.

Looking at FIG. 2, the irrigation pliers 100 includes a pair of elongate jaws 102,128 that are pivotally attached together at a pivoting joint 126 to allow the jaws 102,128 to be pivotally displaced toward and away from each other by moving a first handle 104 and a second handle 130 to and away from each other. In one embodiment, the jaws 102,128 include a first jaw 102 and a complimentary second opposed jaw 128.

Figure 3:
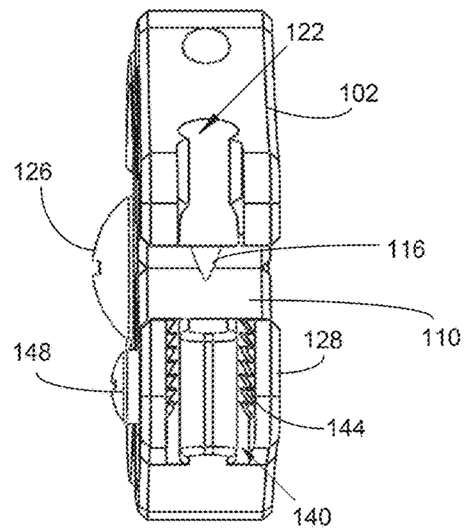
FIG. 3 illustrates a frontal view of the irrigation pliers shown in FIG. 1, in accordance with an embodiment of the present invention.

As the frontal view of FIG. 3 shows, the jaws 102,128 have outer surfaces and complementary gripping surfaces 106,144. The jaws 102,128 utilize a combination of gripping surface area, ridges, concavities, slots, and lips to enable fixed holding, fitting, cutting, and forming holes in the irrigation tube 200.

The jaws 102,128 and handles 104,130 are disposed generally in the same plane. In this manner, the jaws 102,128 may be pivotally displaced between an open positon and a closed position by squeezing and releasing the first handle 104 and the second handle 130. In some embodiments, the jaws 102,128 may be biased to move to the open or closed position, or may be free-moving.

Figure 4:
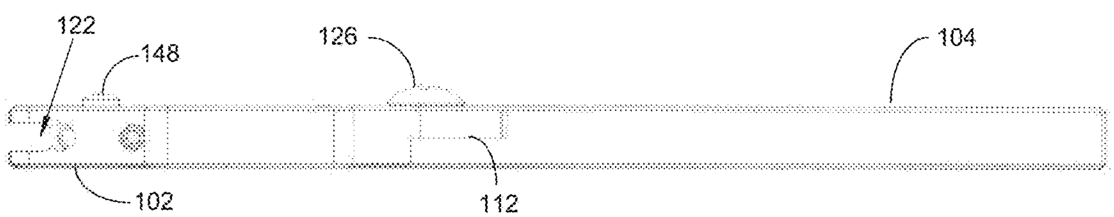
FIG. 4 illustrates a top edge view of the irrigation pliers shown in FIG. 1, in accordance with an embodiment of the present invention.

Turning now to FIG. 4, the handles 104,130 may be elongated and extending from the jaws 102,128 in a curved disposition. The first handle 104 may include a first lip 112 extending along the length of the first handle 104. The second handle 130 may include a second lip 146 extending along the length of the second handle 130. The lips 112,146 facilitate manipulation of the handles 104,130. In one embodiment, the handles 104,130 are operable left-handed and right-handed.

Turning back to FIG. 1, the first jaw 102 may be defined by a first gripping surface 106. The second jaw 128 may be defined by a similar second gripping surface 144. The gripping surfaces 106,144 may include a series of ridges, protrusions, or depressions that can grip a cylindrically-shaped object, such as an irrigation tube 200. The gripping surfaces 106,144 are generally opposed and complementary to each other, such that bringing the jaws 102,128 together to the closed position enables secure gripping of an irrigation tube 200, a nozzle, a drip emitter 202, or any fixture associated with irrigation.

In some embodiments, the first jaw 102 includes a proximal concavity 108 that is sized and dimensioned to retain a blade 110. The proximal concavity 108 is gapped, to receive the blade 110. A blade 110 adjustment member 146, such as a screw, may be used to selectively tighten or loosen the blade 110 in the gapped proximal concavity 108. The blade 110 may include a generally rectangular, flat plane with a sharp edge that can penetrate the polymer materials associated with irrigation tubing, pipes, and conveyors.

Figure 5:
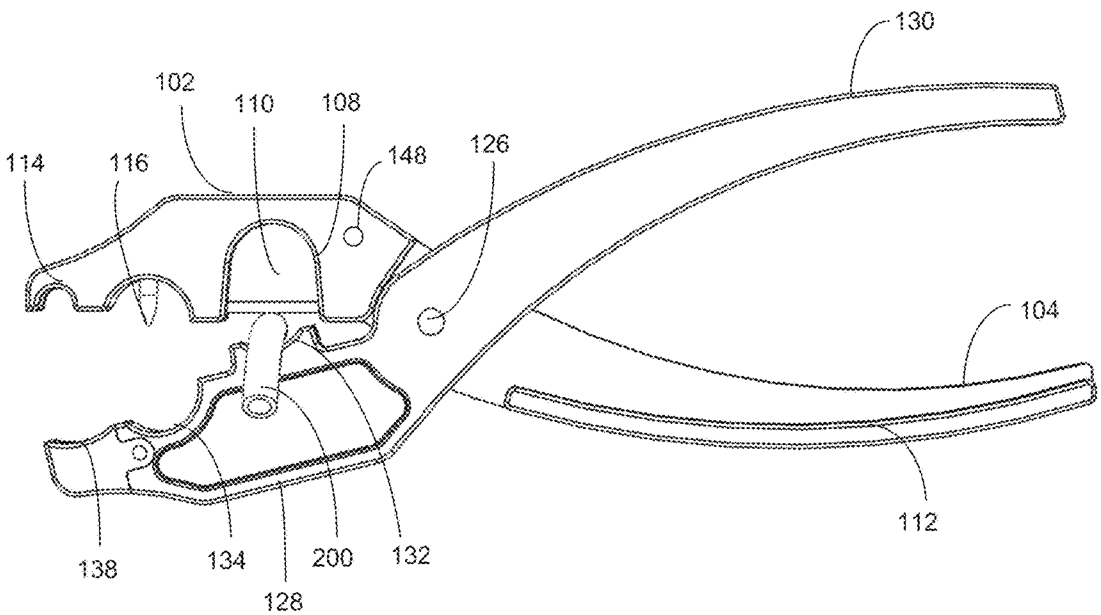
FIG. 5 illustrates a perspective view of the irrigation pliers cutting an irrigation tube with a blade, in accordance with an embodiment of the present invention.

As FIG. 5 illustrates, the second opposed jaw 128 includes a saddle 132 configured to engage a piece of the irrigation tube 200. In this manner, closure of the jaws 102,128 to the closed position causes the blade 110 to cut a length of the irrigation tube 200 across the saddle 132. The saddle 132 is concave to receive a cylindrical-shaped object, such as an irrigation tube 200.

The saddle 132 provides a rigid, generally concave surface for stable retention of the irrigation tube 200 during cutting. In some embodiments, the saddle 132 is sufficiently concave, so as to retain the irrigation tube 200 in place while cutting. The saddle 132 may also hold a tee joint and 90° fittings for attachment with the irrigation tube 200. The irrigation tube 200 may traverse the saddle 132 to selectively cut a desired length of the irrigation tube 200. In this manner, any length of irrigation tube 200 is possible.

Figure 6:
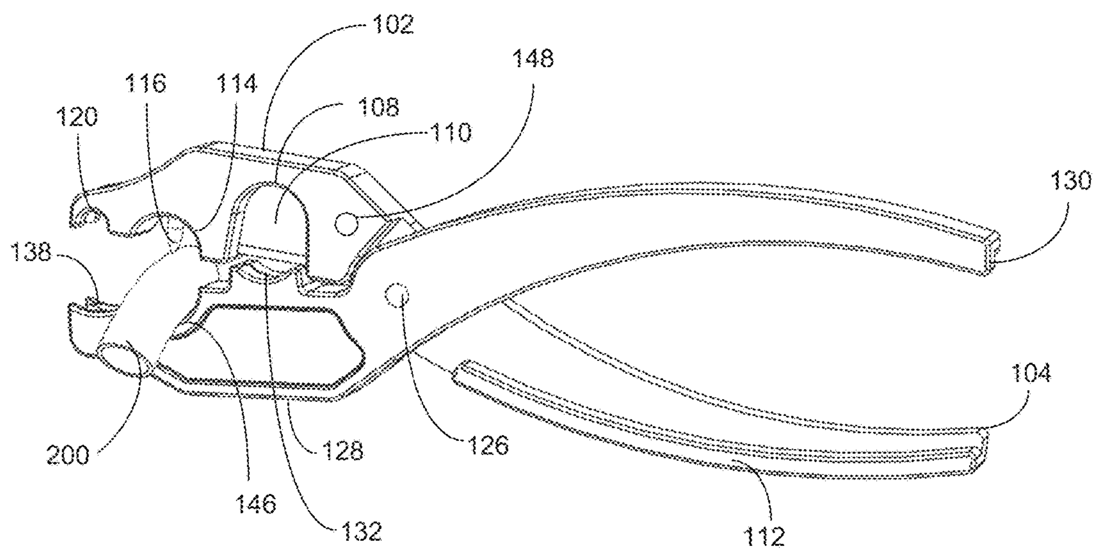
FIG. 6 illustrates a perspective view of the irrigation pliers penetrating an irrigation tube with a spike, in accordance with an embodiment of the present invention.

Looking now at FIG. 6, the first jaw 102 includes a first middle concavity 114 having an inwardly-directed spike 116, while the second jaw 128 includes a second middle concavity 134 that is configured to engage a piece of irrigation tube 200. Closure of the jaws 102,128 to the closed position causes the spike 116 to pierce a hole in the irrigation tube 200. The irrigation tube 200 may traverse the second middle concavity 134 to selectively puncture a desired section of the irrigation tube 200.

The jaws 102,128 further comprise terminal regions 118, 136 that enable secure retention, manipulation, and fitting of the irrigation tube 200. A first jaw 102 terminates at a first terminal region 118. The first terminal region 118 includes a first distal concavity 120 defined by a first slot 122. The first slot 122 has a first textured surface 124, which may include ridges, depressions, protrusions, and patterns. The first slot 122 is configured to securely retain the irrigation tube 200, the nozzle, or the drip emitter 202 (FIGS. 7 and 8).

Similarly, the second jaw 128 terminates at a second terminal region 136. The second terminal region 136 includes a second distal concavity 138 defined by a second slot 140. The second slot 140 has a second textured surface 142, which may include ridges, depressions, protrusions, and patterns. The second slot 140 securely retains the irrigation tube 200, the nozzle, and the drip emitter 202 in general alignment with the first slot 122 for fitting and manipulating the irrigation tube 200 (FIGS. 9 and 10).

Figure 7:
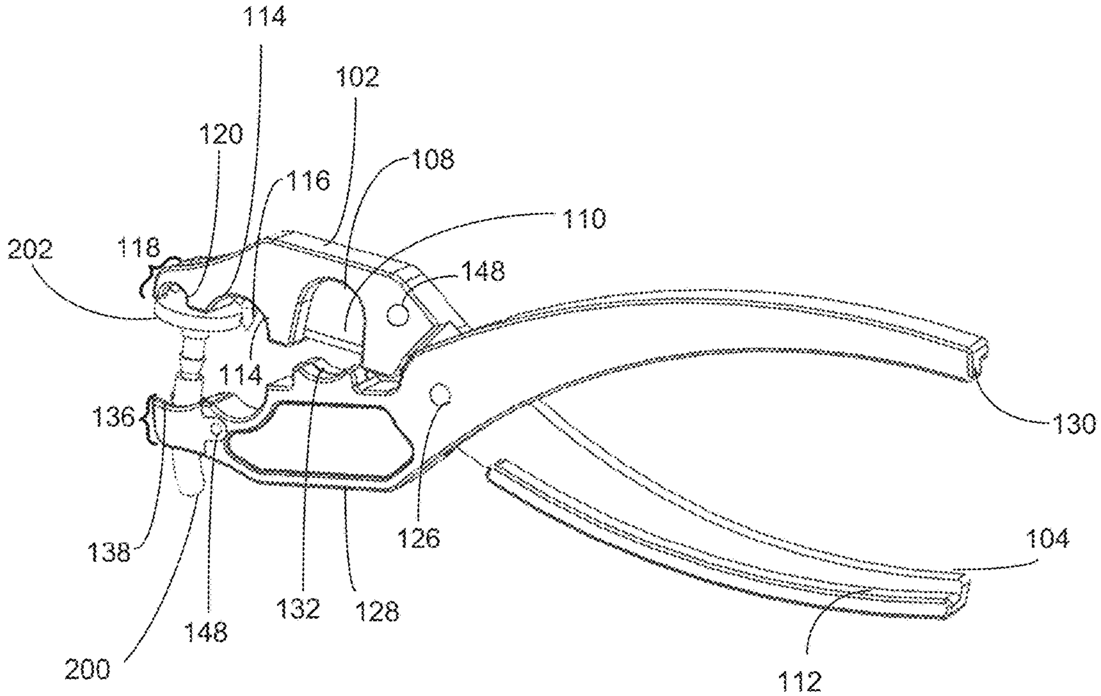
FIG. 7 illustrates a perspective view of the irrigation pliers fitting a drip emitter to an irrigation tube, with the drip emitter buttressed against the first terminal region and the irrigation tube passing through the second slot, in accordance with an embodiment of the present invention.
Figure 8:
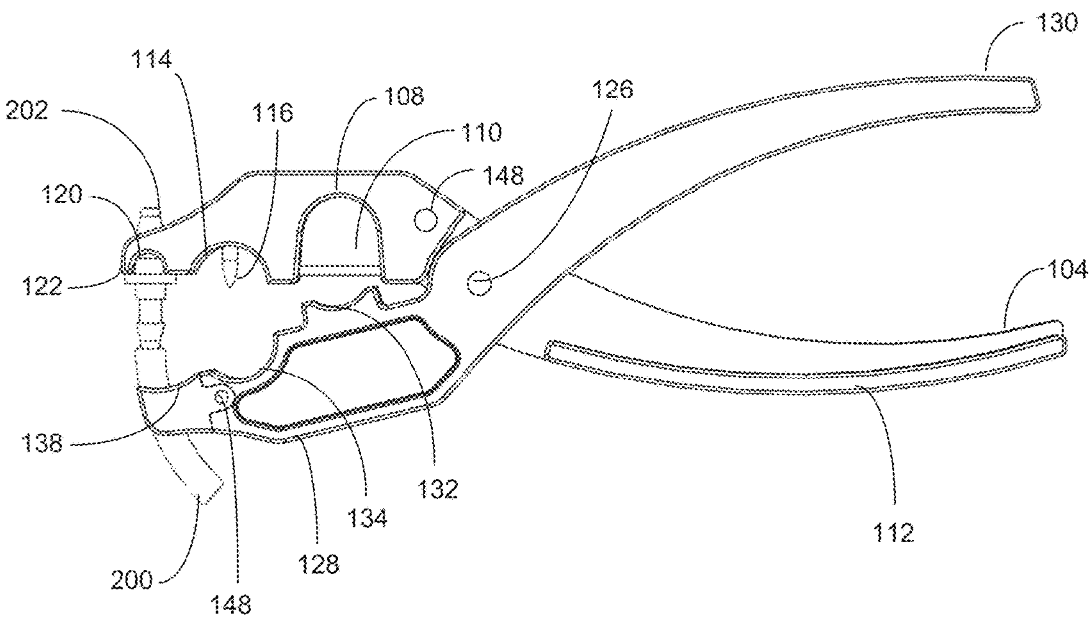
FIG. 8 illustrates a perspective view of the irrigation pliers fitting a drip emitter to an irrigation tube, with the irrigation tube passing through the first and second slots, in accordance with an embodiment of the present invention.

For example, FIG. 7 illustrates a perspective view of the irrigation pliers 100 fitting a drip emitter 202 to an irrigation tube 200, with the drip emitter 202 buttressed against the first terminal region 118 and the irrigation tube 200 passing through the second slot 140. FIG. 8 illustrates a perspective view of the irrigation pliers 100 fitting a drip emitter 202 to an irrigation tube 200, with the irrigation tube 200 passing through the first and second slots 122,140.

The drip emitter 202 is more easily coupled to the irrigation tube 200 using the first terminal region 118 or second slot 140 as a brace. Further, the length of the irrigation tube 200, and the placement of holes in the irrigation tube 200 may be controlled through the cutting and penetrating functions described above. The slots 122, 140 may also be tapered to create a tight placement of the irrigation tube 200 in the respective terminal regions 118, 136.

Figure 9:
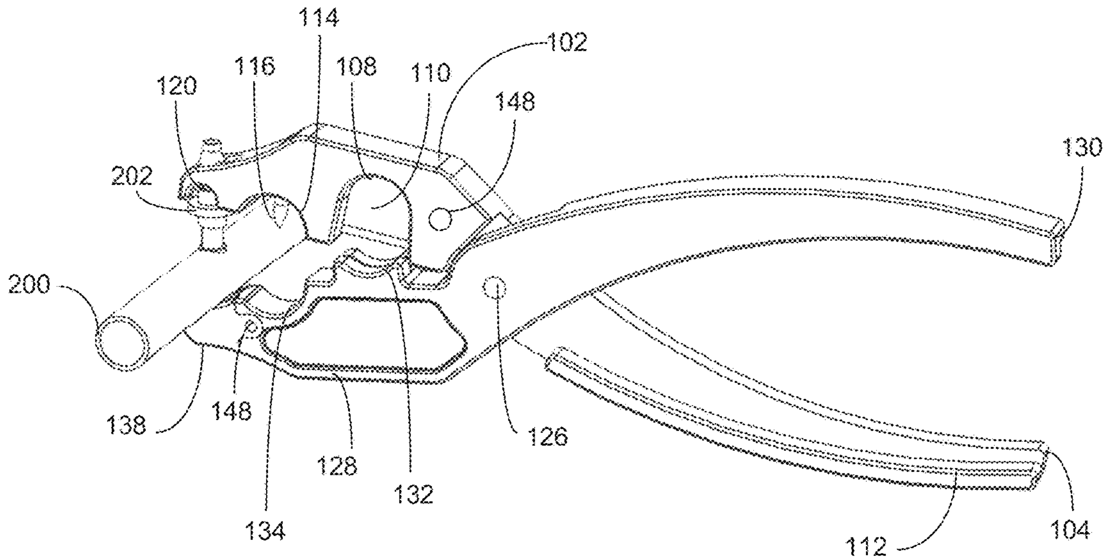
FIG. 9 illustrates a perspective view of the irrigation pliers fitting a drip emitter to an irrigation tube, with the drip emitter set in the first distal concavity and the irrigation tube passing through the second slot, in accordance with an embodiment of the present invention.
Figure 10:
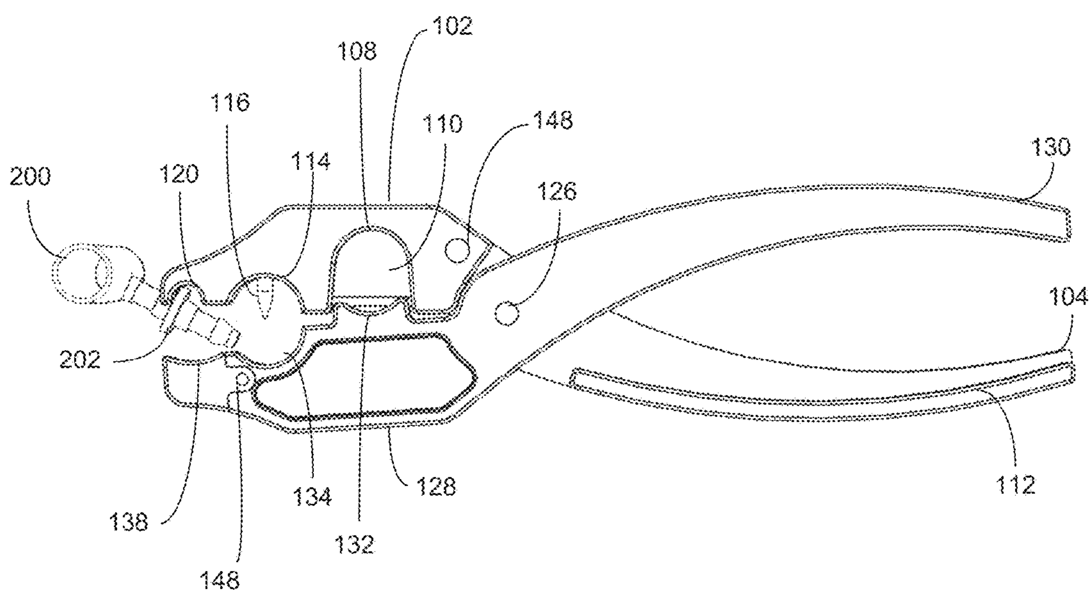
FIG. 10 illustrates a perspective view of the irrigation pliers removing a drip emitter fitting from an irrigation tube, with the irrigation tube passing through the first slot and resting against the second terminal region, in accordance with an embodiment of the present invention.

FIG. 9 illustrates a perspective view of the irrigation pliers 100 fitting a drip emitter 202 to an irrigation tube 200, with the drip emitter 202 set in the first distal concavity 120 and the irrigation tube 200 passing through the second slot 140. Similarly, FIG. 10 illustrates a perspective view of the irrigation pliers 100 fitting a drip emitter 202 to an irrigation tube 200, with the irrigation tube 200 passing through the first slot 122 and resting against the second terminal region 136.

The second terminal region 136 may be pivotally adjusted to accommodate variously sized and dimensioned irrigation tubes, nozzles, and drip emitters. In one embodiment, the second terminal region 136 pivots about the second jaw 128, so as to orient the second terminal region 136, i.e., the second slot 140, in the most effective positon for retaining the irrigation tube 200 or drip emitter 202. An adjustment member 148 may be used to tighten and loosen the second terminal region 136 at an angle in relation to the second jaw 128. The terminal adjustment member 148 may include a screw, a bolt, or a friction fit mechanism.

When the irrigation tube 200 is retained in the first or second slots 122,140, forcible insertion of the nozzle or drip emitter 202 into a terminal opening of the irrigation tube 200 or the hole previously formed in the irrigation tube 200 is possible. Further, the irrigation tube 200 may be sufficiently held in the slots 122,140 to enable bending in lateral and coplanar directions relative to the multifunctional pliers 100. This function is possible with one hand, as the jaws 102,128 are articulated to orient the drip emitter 202, nozzle, and fitting to a desired position against the slots 122,140.

FIG. 11 illustrates an exemplary method 300 of piercing, cutting, and fitting an irrigation tube 200 with an irrigation pliers 100. The method 300 facilitate and expedite implanting an irrigation pipe 200 amongst the plantations to be irrigated, and, then, to join different irrigation tubes, and to fit drip emitters and nozzles individually in the exact location on the irrigation tube where it is necessary to ensure that water is distributed.

The method 300 may include an initial Step 302 of providing an irrigation pliers 100, the irrigation pliers 100 comprising a first jaw 102 and a second jaw 128 being pivotally attached together at a pivoting joint 126. The opposed, complementary jaws 102, 128 comprise gripping surfaces 106, 144, a blade 110, a spike 116, and a pair of slots 122,140 that can be manipulated by a pair of elongate handles 104,130 to pierce, fit, and deform an irrigation tube 200 in preparation for mating with various nozzles, drip emitters, fittings, and secondary tubes. A Step 304 includes pivotally displacing the jaws toward and away from each other by moving a first handle 104 and a second handle 130 to and away from each other.

In some embodiments, a Step 306 includes engaging an irrigation tube 200 on a saddle 132. A Step 308 comprises closing the jaws 102,128 to a closed position to cause a blade 110 to cut a length of the irrigation tube 200 across the saddle 132. The saddle 132 provides a rigid, generally concave surface for stable retention of the irrigation tube 200 during cutting. In some embodiments, the saddle 132 is sufficiently concave, so as to retain the irrigation tube 200 in place while cutting.

In some embodiments, a Step 310 includes engaging the irrigation tube 200 on a second middle concavity 134. A Step 312 may include closing the jaws 102,128 to the closed position to cause a spike 116 to penetrate a section of the irrigation tube 200 across the second middle concavity 134. This selective formation of holes along the length of the irrigation tube 200 is especially useful for field irrigation operations.

A Step 314 comprises holding a nozzle or a drip emitter 202 in a first slot 122 of a first terminal region 118 of the first jaw 102, or a second slot 140 of a second terminal region 136 of the second jaw 128. A final Step 316 includes coupling the irrigation tube 200 to the nozzle or drip emitter 202.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An irrigation pliers, the pliers comprising:

a first jaw and a second jaw being pivotally attached together at a pivoting joint to allow the jaws to be pivotally displaced toward and away from each other by moving a first handle and a second handle to and away from each other, the first jaw defined by a first gripping surface, the second jaw defined by a second gripping surface, whereby the gripping surfaces are generally opposed and complementary to each other;

a proximal concavity configured to fixedly retain a blade, the proximal concavity disposed on the first jaw;

a saddle disposed on the second jaw, and generally across from the blade, whereby closure of the jaws causes the blade to move towards the saddle;

a first middle concavity configured to fixedly retain a spike, the first middle concavity disposed on the first jaw;

a second middle concavity disposed on the second jaw, and generally across from the spike, whereby closure of the jaws causes the spike to move towards the second middle concavity;

a first terminal region disposed at the terminus of the first jaw, the first terminal region comprising a first distal concavity, the first distal concavity defined by a first slot having a first textured surface; and a second terminal region disposed at the terminus of the second jaw, the second terminal region comprising a second distal concavity, the second distal concavity defined by a second slot having a second textured surface.

2. The pliers of claim 1, wherein the first handle is elongate and extends from the first jaw.

3. The pliers of claim 1, wherein the second handle is elongate and extends form the first jaw.

4. The pliers of claim 1, wherein the first handle and the second handle are configured to operate left-handed and right handed.

5. The pliers of claim 1, wherein the first handle comprises a first lip extending along the length of the first handle.

6. The pliers of claim 1, wherein the second handle comprises a second lip extending along the length of the second handle.

7. The pliers of claim 1, wherein the first jaw comprises a first gripping surface.

8. The pliers of claim 7, wherein the second jaw comprises a second gripping surface.

9. The pliers of claim 8, wherein the gripping surfaces comprise ridges.

10. The pliers of claim 1, wherein the pivoting joint comprises a screw disposed axially through an aperture.

11. The pliers of claim 1, wherein the proximal concavity is gapped.

12. The pliers of claim 1, further including a blade adjustment member configured to tighten and loosen placement of the blade in the gapped proximal concavity.

13. The pliers of claim 1, wherein the spike is disposed inwardly towards the second middle concavity.

14. The pliers of claim 1, wherein the first middle concavity is larger than the first distal concavity.

15. The pliers of claim 1, wherein the second middle concavity is larger than the second distal concavity.

16. The pliers of claim 1, wherein the first textured surface of the first slot and the second textured surface of the second slot comprises ridges, depressions, protrusions, or patterns.

17. The pliers of claim 1, wherein the pliers comprises aluminum, or stainless steel, or both.

18. The pliers of claim 1, further including a terminal adjustment member configured to tighten and loosen the second terminal region at an angle in relation to the second jaw.

19. An irrigation pliers, the pliers comprising:

a first jaw and a second jaw being pivotally attached together at a pivoting joint to allow the jaws to be pivotally displaced toward and away from each other by moving a first handle and a second handle to and away from each other, the first jaw defined by a first gripping surface, the second jaw defined by a second gripping surface, whereby the gripping surfaces are generally opposed and complementary to each other, the first handle being elongate and extending from the first jaw, the first handle comprising a first lip, the second handle being elongate and extending from the second jaw, the second handle comprising a second lip;

a proximal concavity configured to fixedly retain a blade, the proximal concavity disposed on the first jaw, the proximal concavity being gapped;

an adjustment member configured to tighten and loosen placement of the blade in the gapped proximal concavity;

a saddle disposed on the second jaw, and generally across from the blade, whereby closure of the jaws causes the blade to move towards the saddle;

a first middle concavity configured to fixedly retain a spike, the first middle concavity disposed on the first jaw;

a second middle concavity disposed on the second jaw, and generally across from the spike, whereby closure of the jaws causes the spike to move towards the second middle concavity, the spike having a pointed terminus;

a first terminal region disposed at the terminus of the first jaw, the first terminal region comprising a first distal concavity, the first distal concavity defined by a first slot having a first textured surface, whereby the first distal concavity is smaller than the first middle concavity; and a second terminal region disposed at the terminus of the second jaw, the second terminal region comprising a second distal concavity, the second distal concavity defined by a second slot having a second textured surface, whereby the second distal concavity is smaller than the second middle concavity.

20. A method of piercing, cutting, and fitting an irrigation tube with an irrigation pliers, the method comprising:

providing an irrigation pliers, the irrigation pliers comprising a first jaw and a second jaw being pivotally attached together at a pivoting joint;

pivotally displacing the jaws toward and away from each other by moving a first handle and a second handle to and away from each other;

engaging an irrigation tube on a saddle;

closing the jaws to a closed position to cause a blade to cut a length of the irrigation tube across the saddle;

engaging the irrigation tube on a second middle concavity;

closing the jaws to the closed position to cause a spike to penetrate a section of the irrigation tube across the second middle concavity;

holding a nozzle or a drip emitter in a first slot of a first terminal region of the first jaw, or a second slot of a second terminal region of the second jaw; and coupling the irrigation tube to the nozzle or drip emitter.

* * * * *